US012123237B2

(12) United States Patent
Khalife et al.

(10) Patent No.: US 12,123,237 B2
(45) Date of Patent: Oct. 22, 2024

(54) SYSTEMS AND METHODS FOR A HINGE

(71) Applicant: Hoffman Enclosures Inc., Anoka, MN (US)

(72) Inventors: Rony Khalife, Coon Rapids, MN (US); William Anderson, Blaine, MN (US)

(73) Assignee: Hoffman Enclosures Inc., Anoka, MN (US)

( * ) Notice: Subject to any disclaimer, the term of this patent is extended or adjusted under 35 U.S.C. 154(b) by 297 days.

(21) Appl. No.: 17/688,193

(22) Filed: Mar. 7, 2022

(65) Prior Publication Data

US 2022/0282537 A1 Sep. 8, 2022

Related U.S. Application Data

(60) Provisional application No. 63/157,031, filed on Mar. 5, 2021.

(51) Int. Cl.

| | |
|---|---|
| ***E05D 3/02*** | (2006.01) |
| ***A47B 55/00*** | (2006.01) |
| ***E05D 5/12*** | (2006.01) |
| ***E05D 11/00*** | (2006.01) |

(52) U.S. Cl.

CPC ............... *E05D 3/02* (2013.01); *E05D 5/128* (2013.01); *E05D 11/00* (2013.01); *A47B 55/00* (2013.01); *A47B 2220/0069* (2013.01); *E05Y 2900/20* (2013.01)

(58) Field of Classification Search

CPC ........... E05D 3/02; E05D 5/128; E05D 11/00; E05D 7/1044; A47B 55/00; A47B 2220/0069; E05Y 2900/20; E05Y 2900/208; E05Y 2900/602

See application file for complete search history.

(56) References Cited

U.S. PATENT DOCUMENTS

| | | | | |
|---|---|---|---|---|
| 3,178,761 A * | 4/1965 | Restaino | ................ | D05B 75/06 16/257 |
| 4,715,090 A | 12/1987 | Morris | | |
| 4,785,498 A * | 11/1988 | Brotschi | ............... | E05D 7/0018 16/382 |
| 4,800,623 A | 1/1989 | Brockhaus | | |

(Continued)

FOREIGN PATENT DOCUMENTS

| | | | |
|---|---|---|---|
| AT | 13580 U1 * | 2/2014 | ......... E05D 11/0027 |
| CH | 634627 A5 * | 2/1893 | |

(Continued)

*Primary Examiner* — Hanh V Tran

(74) *Attorney, Agent, or Firm* — Quarles & Brady LLP

(57) ABSTRACT

A hinge is provided for hingedly connecting an enclosure door to an enclosure body. The hinge can include a set of hinge leafs, which can include a first leaf and a second leaf, a pin, and a fastener. The pin can extend from the first leaf and can be removably receivable within a pocket in the second leaf. The pin can have a groove extending inward from and around the periphery of the pin and positioned between the proximal pin end and the distal pin end. The fastener can extend into the pocket and at least partially into the groove when the hinge is in a locked configuration, inhibiting the separation of the first and second leafs, and removed from the groove when the hinge is in an unlocked configuration allowing the separation of the first and second leafs.

20 Claims, 6 Drawing Sheets

(56) References Cited

U.S. PATENT DOCUMENTS

| | | | | | |
|---|---|---|---|---|---|
| 4,827,568 | A | * | 5/1989 | Ramsauer | E05D 5/065 16/265 |
| 4,937,916 | A | * | 7/1990 | Redman | E05D 5/10 16/265 |
| 4,979,264 | A | * | 12/1990 | Ramsauer | E05D 7/1061 403/324 |
| 5,481,783 | A | * | 1/1996 | Liou | E05D 7/105 16/DIG. 43 |
| 5,503,491 | A | | 4/1996 | Lu | |
| 5,561,886 | A | | 10/1996 | Flamme | |
| 5,774,939 | A | | 7/1998 | Lu | |
| 6,654,985 | B1 | * | 12/2003 | Lu | E05D 11/082 16/338 |
| 6,868,582 | B2 | | 3/2005 | Lu et al. | |
| 7,325,276 | B2 | * | 2/2008 | Kim | E05D 5/128 16/262 |
| 7,543,358 | B2 | | 6/2009 | Lin et al. | |
| 7,634,837 | B2 | | 12/2009 | Schluter et al. | |
| 8,464,396 | B2 | * | 6/2013 | Westby | E05D 11/0018 16/386 |
| 9,169,679 | B2 | * | 10/2015 | McAdoo | E05D 3/02 |
| 11,350,534 | B1 | * | 5/2022 | Chen | H05K 7/20536 |
| 2003/0221290 | A1 | | 12/2003 | Lu | |
| 2009/0071075 | A1 | | 3/2009 | Hoffmann | |
| 2009/0307873 | A1 | | 12/2009 | Chen | |
| 2012/0294670 | A1 | | 11/2012 | Hsu et al. | |
| 2016/0168893 | A1 | * | 6/2016 | Finkelstein | E05D 11/1078 16/264 |
| 2019/0326734 | A1 | * | 10/2019 | Valsecchi | H02B 1/38 |
| 2020/0002986 | A1 | * | 1/2020 | Smith | E05D 7/10 |
| 2020/0308887 | A1 | | 10/2020 | Raab et al. | |
| 2021/0196085 | A1 | | 7/2021 | Placencia et al. | |
| 2021/0332623 | A1 | | 10/2021 | Reuter et al. | |
| 2022/0145679 | A1 | * | 5/2022 | Bäumer | E05D 7/1044 |

FOREIGN PATENT DOCUMENTS

| | | | | | |
|---|---|---|---|---|---|
| CH | 716231 | A2 | * | 11/2020 | E05D 5/10 |
| CN | 101379265 | A | * | 3/2009 | E05D 11/0054 |
| CN | 110230446 | A | | 9/2019 | |
| CN | 111305672 | A | | 6/2020 | |
| DE | 20301039 | U1 | | 6/2004 | |
| DE | 202011103492 | U1 | | 10/2012 | |
| DE | 102022105466 | B3 | * | 11/2022 | E05D 11/02 |
| EP | 0033877 | A1 | * | 8/1981 | |
| EP | 0177976 | A2 | | 4/1986 | |
| EP | 0157344 | B1 | | 9/1988 | |
| EP | 0274552 | B1 | | 5/1990 | |
| EP | 0274549 | B1 | | 6/1990 | |
| EP | 0292296 | B1 | | 12/1991 | |
| EP | 1158127 | B1 | | 7/2008 | |
| FR | 2608203 | A1 | | 6/1988 | |
| GB | 2204910 | B | | 11/1990 | |
| GB | 2383081 | A | * | 6/2003 | E05D 5/0238 |
| GB | 2511282 | A | | 9/2014 | |
| GB | 2553545 | A | * | 3/2018 | A47K 3/284 |
| WO | 99/39070 | A1 | | 8/1999 | |
| WO | 2008/064828 | A1 | | 6/2008 | |
| WO | WO-2017139844 | A1 | * | 8/2017 | E05D 11/00 |
| WO | 2018/001550 | A1 | | 1/2018 | |
| WO | 2020/169138 | A1 | | 8/2020 | |

* cited by examiner

FIG. 7
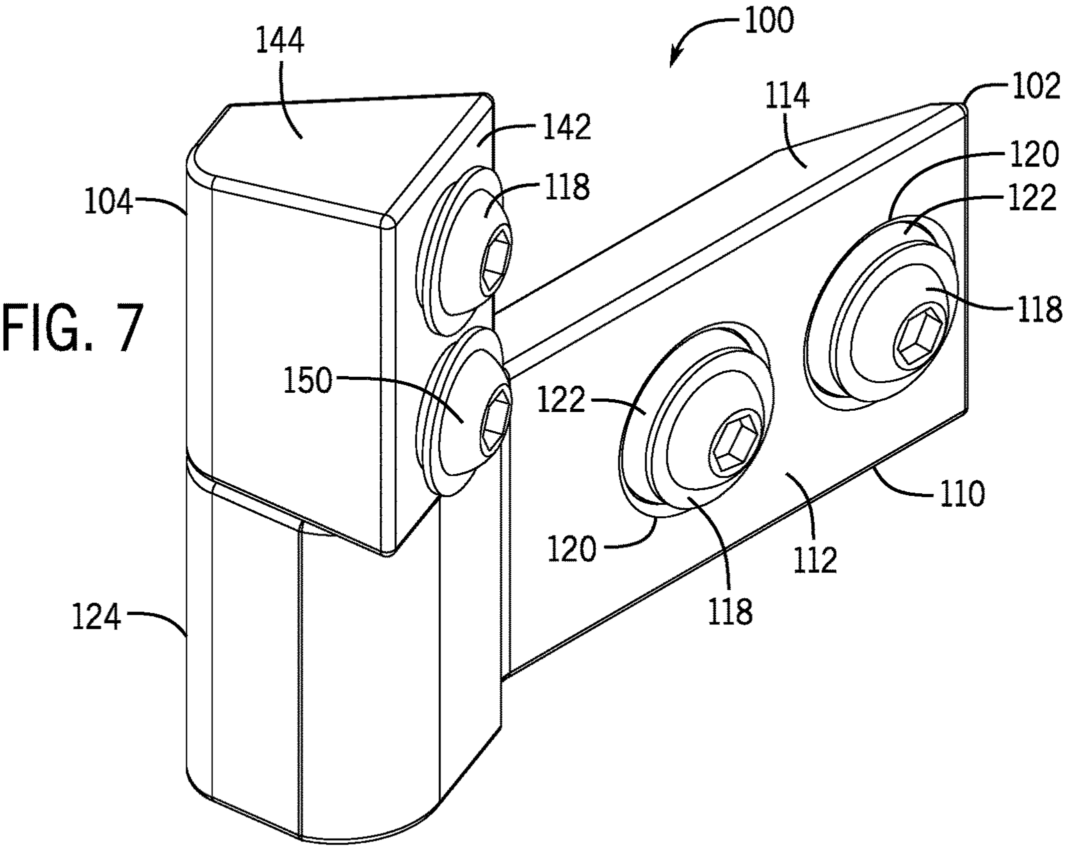
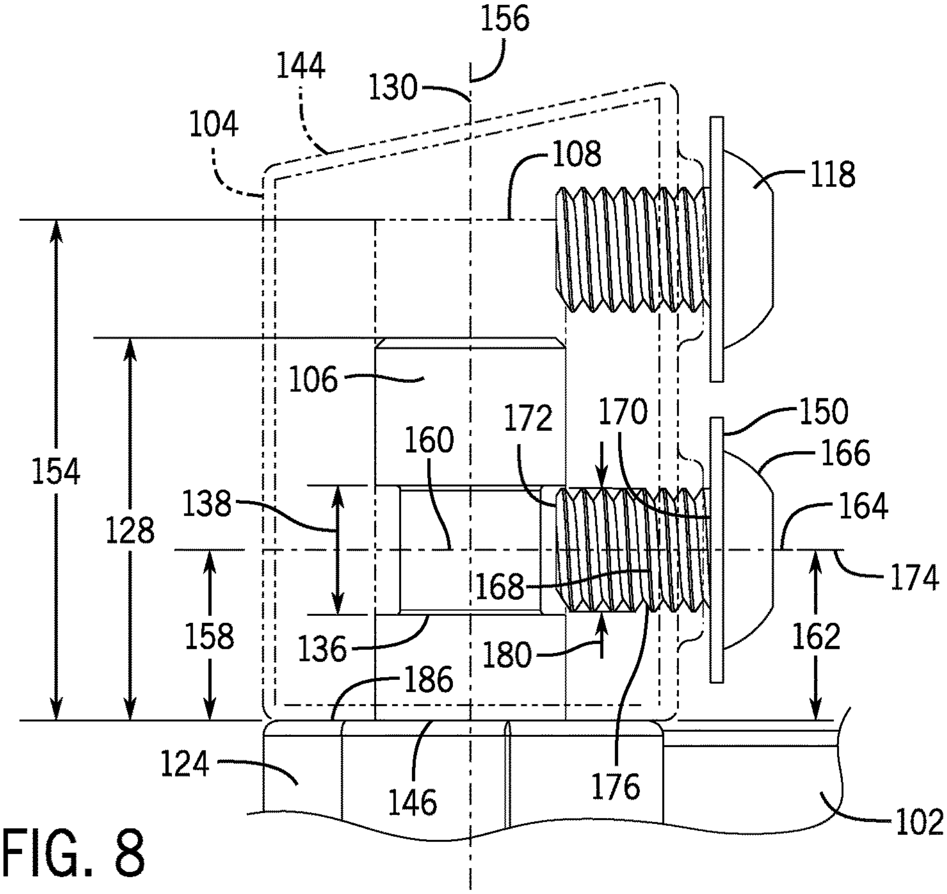
FIG. 8

SYSTEMS AND METHODS FOR A HINGE

CROSS-REFERENCE TO RELATED APPLICATIONS

This application claims priority to U.S. Provisional Patent Application No. 63/157,031, filed Mar. 5, 2021, the entirety of which is incorporated herein by reference.

BACKGROUND

In many applications it may be useful to be able to easily remove a hinged door of an enclosure. For example, for shipment of an industrial enclosure, removing the door can reduce the likelihood of damage to the enclosure from pressure changes experienced during transit. The door can then be reattached to the enclosure after arriving at a destination. In some contexts, other types of enclosures may require or benefit from the removal of a hinged door, including electrical enclosures or other enclosures. For example, when adding components to a door of an electrical cabinet, removing the door can make it easier to cut holes in the door for the components.

SUMMARY

Some embodiments of the invention provide a hinge system for hingedly connecting an enclosure door to an enclosure body. The hinge system can include a set of hinge leafs, including a first leaf and a second leaf. The system can further include a pin extending from the first leaf. The pin can be removably received within a pocket in the second leaf. The system can further include a fastener. The pin can have a pin diameter and a pin length extending along a pin axis. The pin length can be defined from a proximal pin end to a distal pin end. The pin can have a groove that extends radially inward around the periphery of the pin, can be positioned between the proximal pin end and the distal pin end, and can have a groove width. The pocket can have a pocket diameter and a pocket length extending along a pocket axis. The fastener can extend into the second leaf transverse to the pocket axis to secure the second leaf to the enclosure door, with the hinge system selectively in either of: a locked configuration, in which the fastener can extend into the pocket and into the groove to inhibit withdrawal of the pin from the pocket; and an unlocked configuration, in which the fastener can be removed from the groove to allow the withdrawal of the pin from the pocket to separate the first leaf from the second leaf.

Some embodiments of the invention provide an enclosure. The enclosure can include an enclosure body, an enclosure door, and a hinge system that is convertible between a locked configuration in which the enclosure door is fixed to the enclosure body and an unlocked configuration in which the enclosure door is removable from the enclosure body. The hinge system can include a first leaf with a pin, a second leaf with a pocket, and a fastener. The pin can have a circumferential groove. The fastener can extend through the enclosure door and the second leaf and into the pocket to secure the second leaf to one of the enclosure door or the enclosure body, with a distal end of the fastener sized to be removably receivable within the circumferential groove of the pin when the pin is received within the pocket. With the hinge system in the locked configuration the fastener can be received within the groove to secure the pin within the pocket and thereby secure the second leaf and the enclosure door in pivoting engagement with the first leaf and the enclosure body. With the hinge system in the unlocked configuration, the fastener can be clear from the groove to release the pin to be removed from the pocket and thereby permit the enclosure door and the second leaf to be disengaged from the enclosure body and the first leaf.

Some embodiments of the invention can provide a method for an enclosure with an enclosure door, an enclosure body, and a hinge assembly. The method can include installing the enclosure door by: with a first leaf of the hinge assembly secured to the enclosure body and a second leaf of the hinge assembly secured to the enclosure door, moving the enclosure door to align a pin that extends from the first leaf with a pocket of the second leaf; lowering the enclosure door to insert the pin into the pocket and thereby pivotally engage the enclosure door with the enclosure body, with a circumferential groove on the pin extending within the pocket; and after inserting the pin into the pocket, moving the hinge assembly to a locked configuration by extending a fastener into the pocket and into the groove to secure the pin within the pocket and further secure the second leaf to the enclosure door.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 7 is a rear isometric view of the hinge of FIG. 1 with fasteners installed;

FIG. 8 is a side elevation view of a portion of the hinge of FIG. 1 illustrating the joining of a first and a second leaf of the hinge;

DETAILED DESCRIPTION

Figure 1:
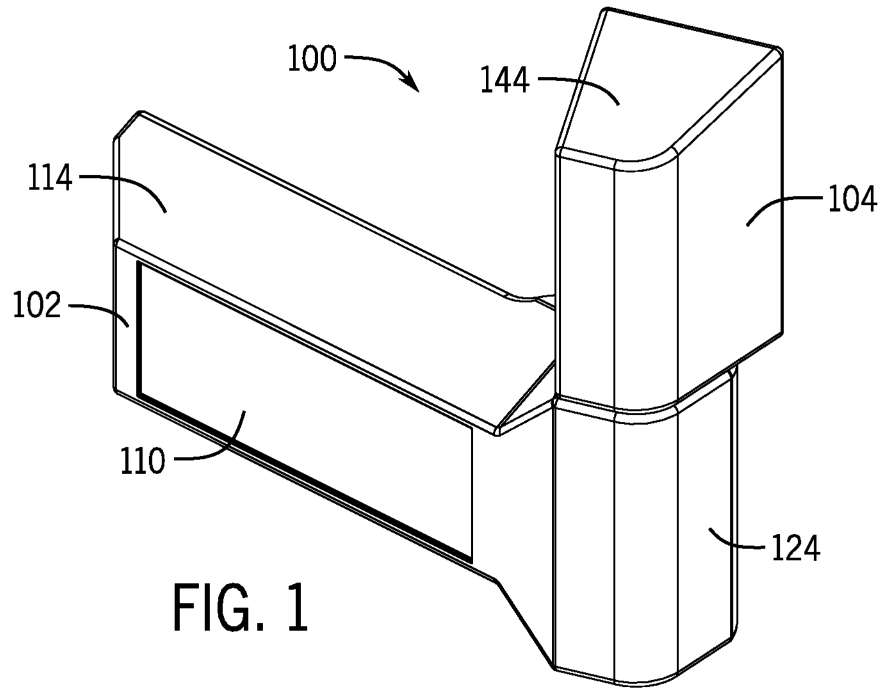
FIG. 1 is a front isometric view of a hinge according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise defined or limited, directional terms are used for convenience of reference for discussion of particular figures or examples. For example, references to downward (or other) directions or top (or other) positions may be used to discuss aspects of a particular example or figure, but do not necessarily require similar orientation or geometry in all installations or configurations.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some of the discussion below describes a hinge that can be converted between a locked configuration, in which a door attached by a hinge cannot be removed from an associated enclosure, and an unlocked configuration, in which the door can be removed from the enclosure. The context and particulars of this discussion are presented as examples only. For example, embodiments of the disclosed invention can be configured in various ways, including with other shapes and arrangements of elements. Similarly, embodiments of the invention can be used for other types of hinged applications other than for use with an enclosure with hinged door. The context and particulars of this discussion are presented as examples only.

Enclosures, for example, industrial enclosures used for enclosing electrical components and instruments, can experience pressure changes during shipment when the door of the enclosure is in a closed position. The change in pressure can cause damage to the enclosure body, the door, the latches, or the hinges. Ideally, the doors are removed prior to shipping to eliminate this potential. As generally noted above, it may also be beneficial to be able to easily remove doors in other contexts. For example, when populating the cabinet with electrical components, switches (e.g., push-button, rotatable selector switches, etc.), status indicator lights, and/or other components can be installed on the door, which requires cutting holes in the door of the cabinet. Easy removal of the door from the cabinet can allow the door to be placed within a Computer Numerically Controlled (CNC) machine or other machining device for more accurate and efficient placement of the holes.

Conventional arrangements for removing the door can include completely removing one half of the hinges from either the door or the enclosure body. This task can be arduous and time consuming for one enclosure, let alone a shipment of many enclosures or the modification of many doors for component installation, as it can require removing fasteners attaching the hinge portion to the enclosure body or door. Further, removing the hinge portion can alter the torque specifications of the fasteners used to secure the hinge portion, because the fasteners may not be reinstalled properly upon the enclosure's arrival at the destination or when reinstalled after door modification. Incorrect torqueing of the fasteners can also affect the efficacy of water-proofing seals, for example, O-rings, that are installed on the hinge portions at the factory.

Embodiments of the invention can address these or other issues. For example, in some embodiments, a hinge can be provided that can convert from a locked configuration to an unlocked configuration by loosening a fastener (e.g., one fastener of many) that is also used to attach one of the hinge leafs to an enclosure door. This can be beneficial in many contexts. For example, it requires a user to loosen only one fastener at each hinge, and it does not require the removal of either portion of the hinge from the enclosure body or the door.

In some embodiments, a hinge can have a leaf with a pin, with a circumferential groove, that can be attachable to an enclosure body and another leaf with a pocket, configured to receive the pin therein, that can be attached to a door. One of the fasteners used to attach the hinge portion to the door can also extent into the circumferential groove on the pin to prevent separation of the door from enclosure body, while still allowing the door to rotate about the pin relative to the enclosure body. To unlock the hinge, a user can partially remove the fastener received within the groove from the door until it is outside of the groove. Then the door can be removed the enclosure body without having to remove any of the hinge portions.

In some embodiments, the fasteners can include different configurations. For example, a fastener can include an internally movable set screw that can move axially within the fastener to be removably received within the groove of the pin. In some embodiments, the fastener can have a distal end that has no threads.

As used herein, a "circumferential" groove refers to a recess that is formed in a body (e.g., a hinge pin) that extends at least partly in a circumferential direction around the body. In some cases, a circumferential groove may extend around a substantial percentage of a full circumference of a body (i.e., more than 40% of the full circumferential distance of the body). For example, a circumferential groove may extend around 50%, 75%, or 100% of a full circumference of the body.

Figure 2:
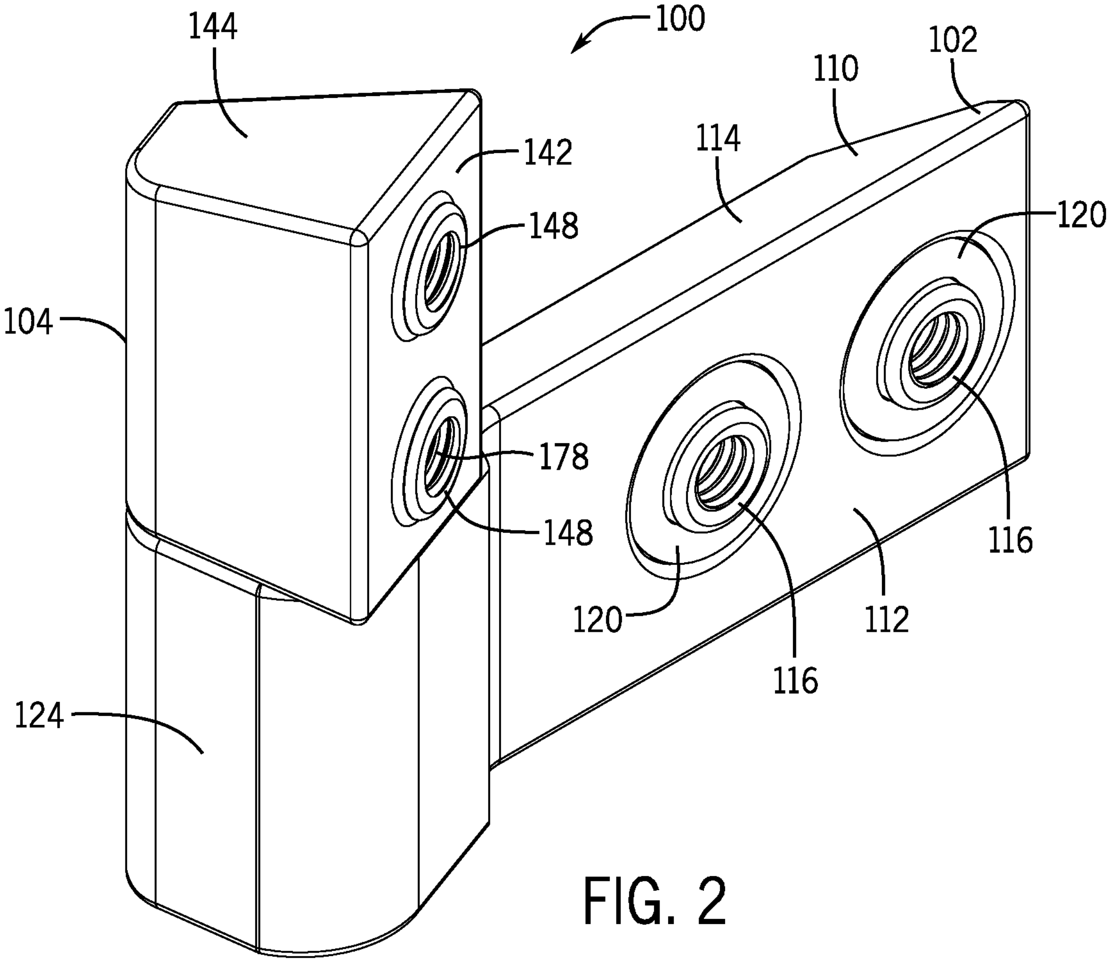
FIG. 2 is a rear isometric view of the hinge of FIG. 1.

FIGS. 1 and 2 illustrate an example hinge system 100 according to an embodiment of the present invention. The hinge system 100 is shown in an assembled configuration and includes a first leaf 102 and a second leaf 104. The first leaf 102 and the second leaf 104 are rotatable relative to each another about a pin 106 (shown in FIGS. 3 and 8), which extends from the first leaf 102 to be received within a pocket 108 (shown in FIGS. 6 and 8) in the second leaf 104.

Figure 3:
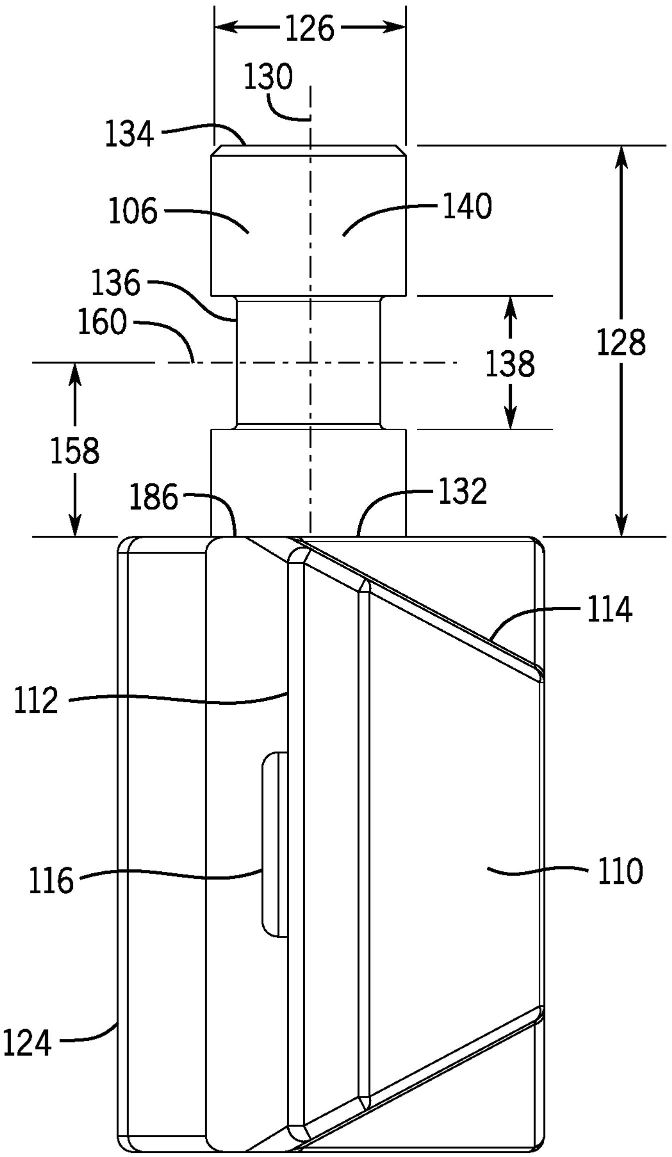
FIG. 3 is a right side elevation view of the first leaf of the hinge of FIG. 1.
Figure 4:
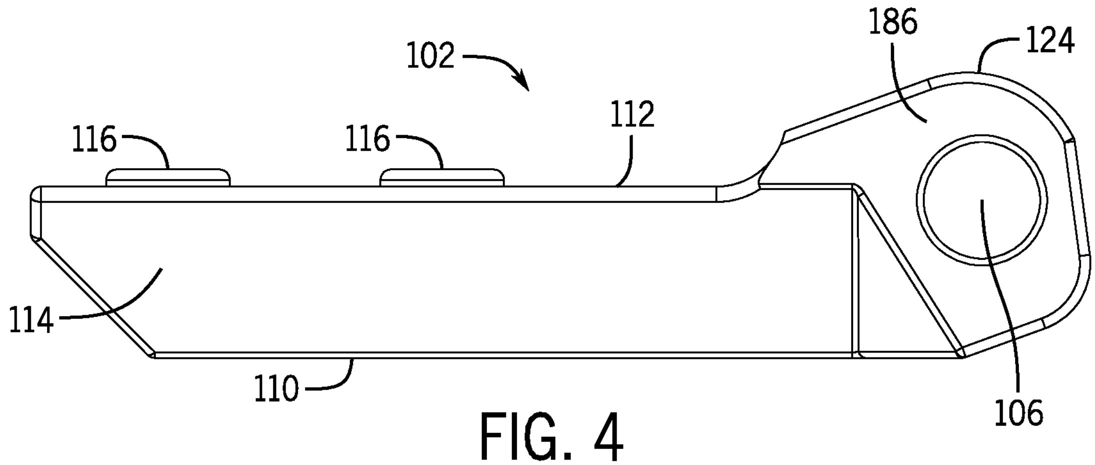
FIG. 4 is a top plan view of the first leaf of FIG. 3.
Figure 9:
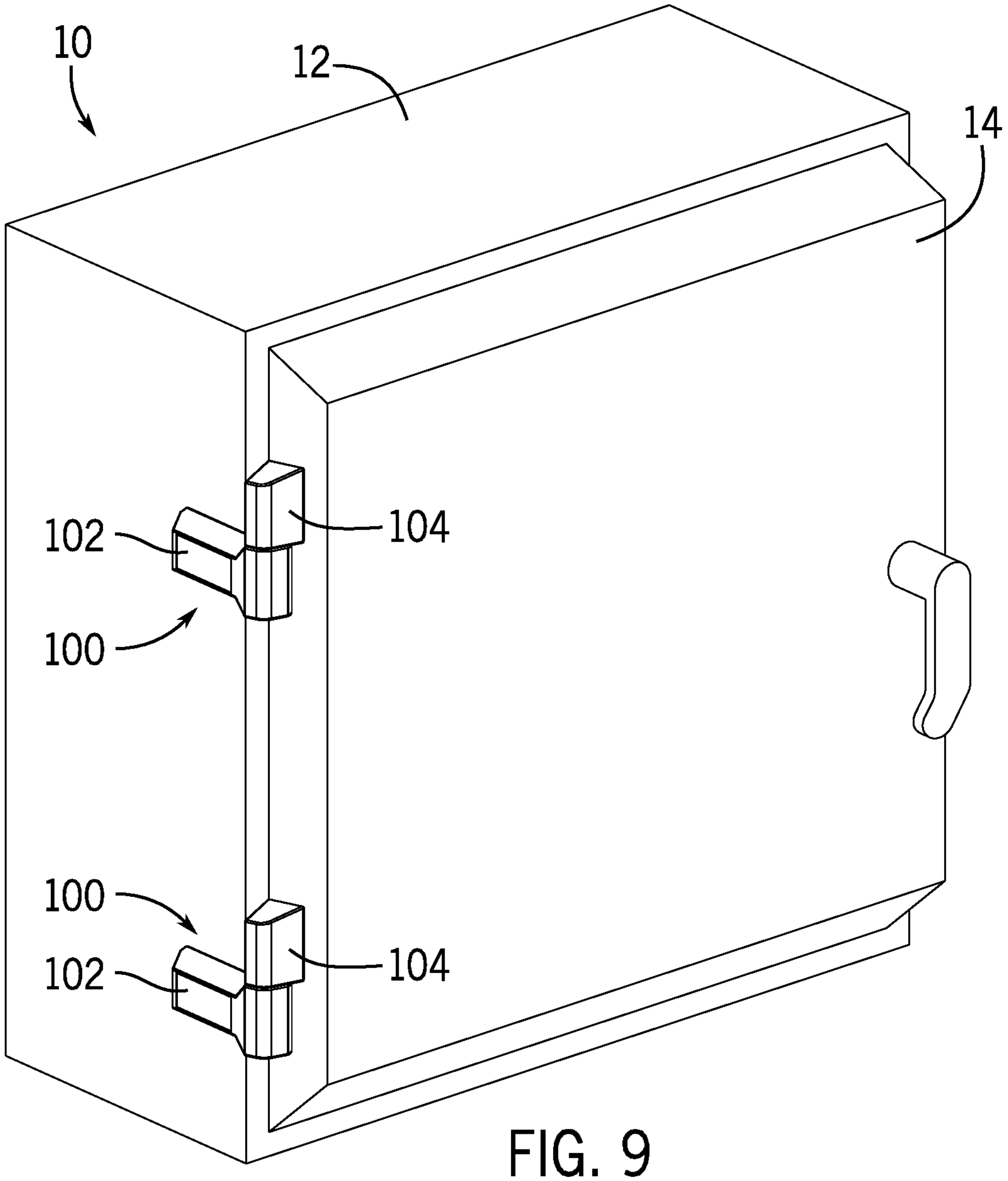
FIG. 9 is a front perspective view of an enclosure with a set of hinges of FIG. 1 according to another embodiment of the invention.

FIGS. 3 and 4 show the first leaf 102 in isolation. The first leaf 102 includes a mounting portion 110 with a first leaf contact surface 112 and a mounting portion top surface 114. The mounting portion 110 further includes first leaf mounting holes 116 extending inward from the first leaf contact surface 112. The first leaf mounting holes 116 are configured to receive mounting fasteners 118 (shown in FIG. 7) for securing the first leaf 102 to an external (or other) surface of an enclosure body 12 of an enclosure 10 (shown in FIG. 9). As shown in FIG. 2, in some embodiments, the first leaf mounting holes 116 can be surrounded by a recessed ring

120. Each of the recessed rings 120 can be sized and configured to receive an O-ring 122 (shown in FIG. 7). The O-rings 122 can provide a liquid tight connection between the first leaf 102 and the enclosure body 12 of the enclosure 10.

Continuing to look at FIGS. 3 and 4, the first leaf 102 also includes a hinge portion 124. The hinge portion 124 and the mounting portion 110 are integrally formed to provide a unitary, one-piece, first leaf 102, but other configurations are contemplated. The pin 106 extends upward from a hinge portion top surface 186 of the hinge portion 124, with respect to the orientation of the first leaf 102 as shown in FIG. 3. The pin 106 has a pin diameter 126 and a pin length 128 extending along a pin axis 130. The pin length 128 is defined as extending from a proximal pin end 132, nearest the hinge portion 124 of the first leaf 102, to a distal pin end 134. The pin 106 also has a groove 136, with a groove width 138, extending inward from and circumferentially along a peripheral surface 140 of the pin 106. The groove 136 is positioned between the proximal pin end 132 and the distal pin end 134.

Figure 5:
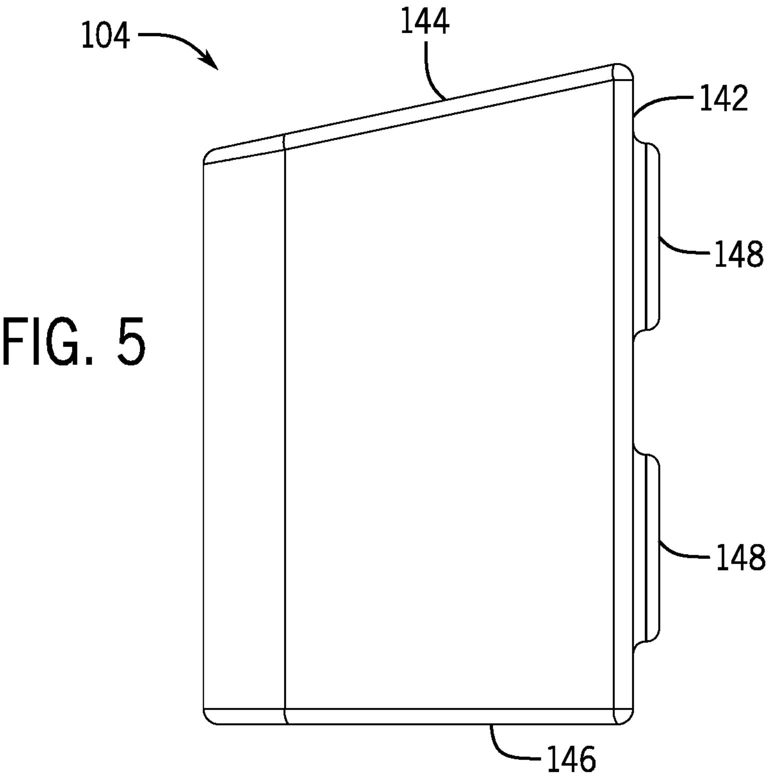
FIG. 5 is a right side view of the second leaf of the hinge of FIG. 1.
Figure 6:
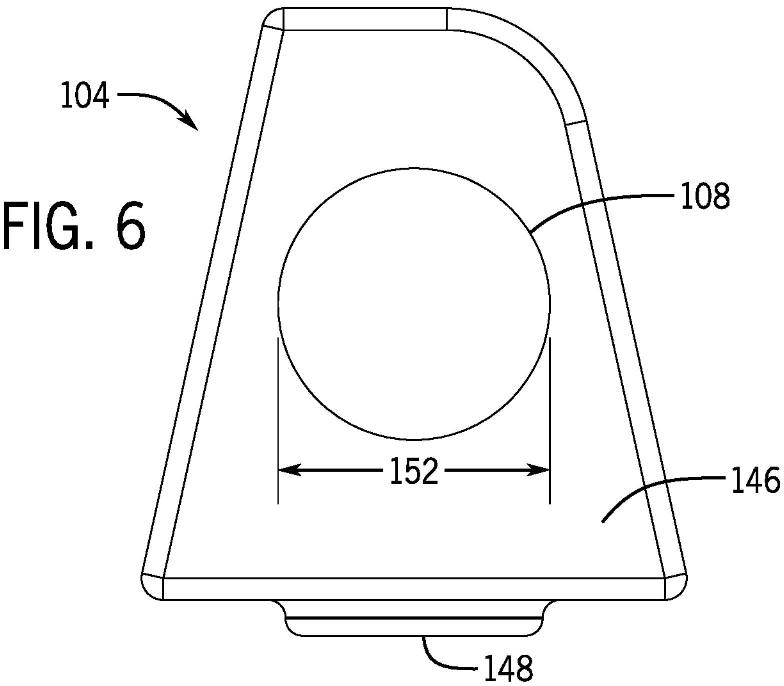
FIG. 6 is a bottom plan view of the second leaf of FIG. 5.

FIGS. 5 and 6 show the second leaf 104 in isolation. The second leaf 104 includes a second leaf contact surface 142, a second leaf top surface 144, and a second leaf bottom surface 146. The second leaf 104 further includes second leaf mounting holes 148 extending inward from the second leaf contact surface 142. The second leaf mounting holes 148 have internal threads 178 (shown in FIG. 2) are configured to receive a mounting fastener 118 and a locking fastener 150 (shown in FIGS. 7 and 8) via a threaded engagement. Both the mounting fastener 118 and the locking fastener 150 are configured to secure the second leaf 104 to an external surface of an enclosure door 14 of the enclosure 10 (shown in FIG. 9). In the illustrated embodiment, the internal threads 178 are integrally formed with the second leaf 104, although other configurations are contemplated.

Continuing to look at FIG. 6, with further reference to FIG. 8, the pocket 108 of the second leaf 104 is shown extending inward from the second leaf bottom surface 146. The pocket 108 extends upward into the second leaf 104, with respect to the orientation of the second leaf 104 as shown in FIG. 8. The pocket 108 has a pocket diameter 152 and a pocket length 154 extending along a pocket axis 156. The pocket diameter 152 can be sized and configured to be slightly larger than the pin diameter 126 for ease of insertion of the pin 106 into the pocket 108 but also sized to provide a relatively snug fit to reduce slop within the hinge system 100 between the first leaf 102 and the second leaf 104. The pocket length 154 can be configured to be longer than the pin length 128 to allow complete reception of the pin 106 within the pocket 108. As shown in FIG. 8, when the first leaf 102 and the second leaf 104 are joined, the longer pocket length 154 permits the second leaf bottom surface 146 to contact the hinge portion top surface 186 of the first leaf 102 so that the second leaf 104 rests upon the first leaf 102.

Referring in particular to FIG. 8, the locking fastener 150 can be seen as engaged with both the second leaf 104 and the groove 136 of the pin 106. The locking fastener 150 has a locking fastener head 166 and a locking fastener shaft 168 extending from the locking fastener head 166 along a locking fastener axis 174 from a locking fastener shaft proximal end 170 to a locking fastener shaft distal end 172. The locking fastener shaft 168 has external threads 176 extending therealong from the proximal end 170 to the distal end 172. The external threads 176 are configured to be threadingly engaged with the internal threads 178 (shown in FIG. 2) in the second leaf mounting hole 148 nearest the second leaf bottom surface 146.

Still looking at FIG. 8, the location of the groove 136 of the pin 106 relative to the locking fastener 150 is shown, with the second leaf 104 joined with the first leaf 102. A groove distance 158, defined as the distance from the hinge portion top surface 186 to a groove center 160, is equal to a second leaf mounting hole distance 162, defined as the distance from the second leaf bottom surface 146 to a second leaf mounting hole axis 164 of the second leaf mounting hole 148 nearest the second leaf bottom surface 146. With this arrangement, it is contemplated that a user can place the second leaf 104 on the first leaf 102, with the pin 106 fully received within the pocket 108, and the locking fastener 150 will be aligned with the groove 136 for ease of locking the second leaf 104 to the first leaf 102. It is further contemplated that the locking fastener shaft 168 can have an external shaft diameter 180 equal to or slightly smaller than the groove width 138 to ensure operable reception of the locking fastener shaft 168 to an appropriate depth within the groove 136 of the pin 106. In some embodiments, the locking fastener 150 is a threaded fastener and the locking fastener shaft 168 is a threaded shaft, whereby the external shaft diameter 180 is equal to a major diameter of the threaded shaft.

In some embodiments, additional features can be included, including features configured to provide resistance to corrosion (e.g., liquid shedding features). For example, the mounting portion top surface 114 of the first leaf 102 and the top surface 144 of the second leaf 104 are sloped relative to the respective pin axis 130 and the pocket axis 156 (shown in FIGS. 3 and 8, respectively). The sloped top surfaces 114, 144 of the first and second leafs 102, 104 are configured to shed a liquid (not shown) that may come in contact therewith, limiting the time of contact between the liquid and the hinge system 100 and thereby reducing the likelihood of corrosion.

Figure 10:
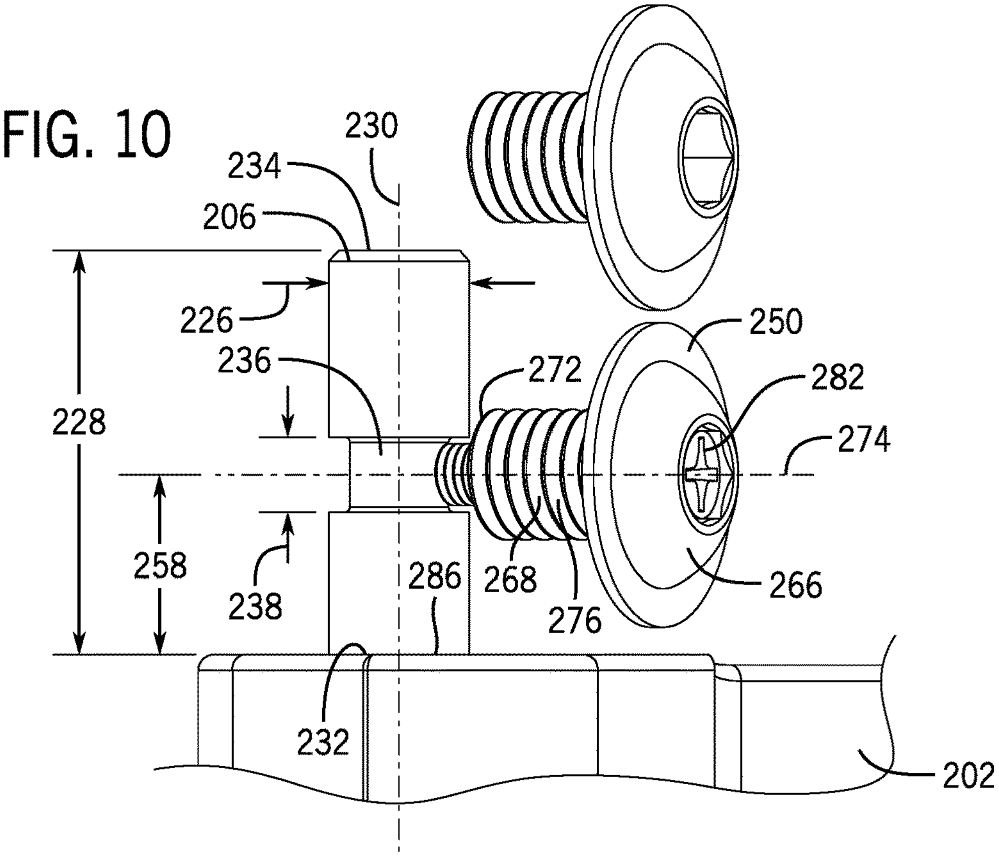
FIG. 10 is a front isometric view of a portion of a first leaf and a fastener for a hinge according to another embodiment of the invention.

FIG. 10 illustrates another embodiment of a pin 206 and a locking fastener 250, as also can be used in a hinge according to the invention. In many aspects, the pin 206 and the locking fastener 250 are similar to the pin 106 and the locking fastener 150 described above and similar numbering in the 200 series is used for the pin 206 and the locking fastener 250. For example, the pin 206 has a pin diameter 226, a pin length 228 extending from a hinge portion top portion 286 of a first leaf 202 and along a pin axis 230 from a proximal pin end 232 to a distal pin end 234, and a circumferential groove 236. Further, the locking fastener 250 has a locking fastener head 266 and a locking fastener shaft 268 extending from the locking fastener head 266 along a locking fastener axis 274 from a locking fastener shaft proximal end (hidden) to a locking fastener distal end 272. The locking fastener shaft 268 has external threads 276 extending therealong from the proximal end (hidden) to the distal end 272. The external threads 276 are configured to be threadingly engaged with internal threads of a second leaf mounting hole nearest a second leaf bottom surface.

In some aspects, however, the pins 106, 206 differ from each other and the locking fasteners 150, 250 differ from each other. For example, the groove width 238 is smaller and the groove distance 258 from the hinge portion top surface 286 of the first leaf 202 to the groove center 260 is larger. Additionally, the locking fastener 250 further includes a set screw 282 extending through the center of the locking fastener 250 from the locking fastener head 266 through the locking fastener distal end 272 and coaxially with the locking fastener axis 274. The set screw 282 is threadably engaged with an internal passage (hidden) within and extending axially through the locking fastener 250. The set screw 282 is configured to be adjusted independently of the adjustment of the locking fastener 250. In this way, the second leaf (not shown) can be locked to and unlocked from the first leaf 202 through adjustment of the set screw 282 without adjusting the connection of the locking fastener 250 to an enclosure door (e.g., the enclosure door 14 shown in FIG. 9).

Figure 11:
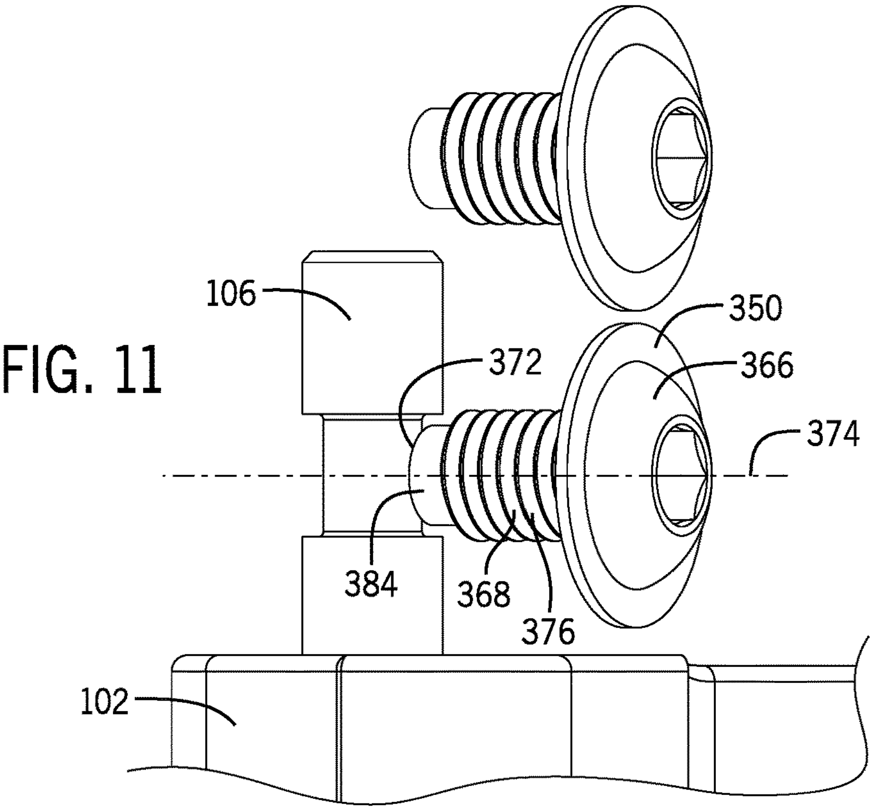
FIG. 11 is a front isometric view of a portion of a first leaf and a fastener for a hinge according to another embodiment of the invention.

FIG. 11 illustrates another embodiment of a locking fastener 350, as also can be used in a hinge (e.g., with the first leaf 102 and pin 106 as discussed above) according to the invention. In many aspects, the locking fastener 350 is similar to the locking fastener 150 described above and similar numbering in the 300 series is used for the locking fastener 350. For example, the locking fastener 350 has a locking fastener head 366 and a locking fastener shaft 368 extending from the locking fastener head 366 along a locking fastener axis 374 from a locking fastener shaft proximal end (hidden) to a locking fastener shaft distal end 372. The locking fastener shaft 168 has external threads 176 extending therealong, which are configured to be threadingly engaged with internal threads in a second leaf mounting hole nearest a second leaf bottom surface.

In some aspects, however, the locking fasteners 150, 350 differ from each other. For example, the external threads 376 do not extend to the locking fastener shaft distal end 372, instead leaving a threadless portion 384. In some embodiments, the locking fastener 350 can be a "dog-point" fastener.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

For example, with reference to FIGS. 7 and 8, some embodiments can include a method by which a user can convert the hinge system 100 from a locked configuration to an unlocked configuration. With the second leaf 104 set on the first leaf 102 with the pin 106 received within the pocket 108 and the locking fastener shaft distal end 172 of the locking fastener 150 received within the groove 136 of the pin 106, a user can rotate the locking fastener 150 to move the locking fastener 150 axially within the second leaf mounting hole 148 away from the pin 106 until the locking fastener shaft distal end 172 is removed from the groove 136 of the pin 106. A user can then lift the second leaf 104 relative to the first leaf 102 to remove the pin 106 from the pocket 108, if desired, to separate the first and second leafs 102, 104. It is contemplated that in some embodiments of the method according to the invention, the first leaf 102 can be pre-attached to an enclosure body (e.g., the enclosure body 12 shown in FIG. 9) with the mounting fasteners 118, and the second leaf 104 can be pre-attached to an enclosure door (e.g., the enclosure door 14 shown in FIG. 9) with the mounting fastener 118 and the locking fastener 150. It should be understood that it is contemplated that the method described above can be reversed to convert the hinge from an unlocked configuration to a locked configuration.

In the illustrated examples, complementary sets of hinge leafs (e.g., the leafs 102, 104) include a pocket on a leaf secured to the enclosure body and a pin on a leaf secured to the enclosure door. This arrangement can be particularly useful for installation, for example, including as can allow the door to be lifted to align the pocket(s) on the door leaf with the associated pin(s) on the enclosure leaf, and then easily lowered to receive the pin into the pocket. In other examples, however, different relative configurations can be used for leafs with pockets and pins as generally disclosed herein. For example, some embodiments may include a first leaf with a pin on a door and a corresponding second leaf with a pocket on an enclosure body, or may include a pin that extends downwardly to be received into an upwardly opening pocket.

Thus, embodiments of the invention can provide improved hinges for an enclosure. In some embodiments, for example, a door can be removed form an enclosure body by separating the hinge at the joint between the hinge elements. The hinge can have a locked configuration preventing the removal of the door from an enclosure body and an unlocked configuration permitting the removal of the door from the enclosure body. The hinge can include a first leaf with a pin extending therefrom and a second leaf with a pocket configured to receive the pin. The pin can have a circumferential groove that is configured to receive a portion of a fastener extending through the second leaf when in the locked configuration. The fastener can also secure the second leaf to the door. The fastener can be configured to be partially removed from the second leaf to disengage with the pin, while continuing to secure the second leaf to the door.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A hinge system for hingedly connecting an enclosure door to an enclosure body, the hinge system comprising:
- a set of hinge leaves, including a first leaf and a second leaf;
- a pin extending from the first leaf, the pin being removably received within a pocket in the second leaf; and
- a fastener;
- the pin having a pin diameter and a pin length extending along a pin axis, the pin length defined from a proximal pin end to a distal pin end, the pin having a groove that extends radially inward around the periphery of the pin, is positioned between the proximal pin end and the distal pin end, and has a groove width;
- the pocket having a pocket diameter and a pocket length extending along a pocket axis;
- the fastener extending into the second leaf transverse to the pocket axis and configured to extend through the enclosure door to secure the second leaf to the enclosure door, with the hinge system selectively in either of:
  - a locked configuration, in which the fastener extends into the pocket and into the groove to inhibit withdrawal of the pin from the pocket; and an unlocked configuration, in which the fastener is removed from the groove to allow the withdrawal of the pin from the pocket to separate the first leaf from the second leaf.

2. The hinge system of claim 1, wherein the fastener is a first fastener in a set of fasteners also including a second fastener;

wherein the second fastener extends into the second leaf transverse to the pocket axis to further secure the second leaf to the enclosure door, with the second fastener in the same configuration relative to the second leaf in the locked and unlocked configurations.

3. The hinge system of claim 2, wherein the first and second fasteners are spaced axially along the pocket, relative to the direction of the pocket axis.

4. The hinge system of claim 1, wherein the pin length is less than the pocket length.

5. The hinge system of claim 1, wherein the fastener is a threaded fastener having a major diameter and the major diameter is smaller than the groove width.

6. The hinge system of claim 1, wherein the fastener has a fastener body, a fastener head, and a fastener axis, and further includes a set screw extending through the fastener body and the fastener head along the fastener axis;

wherein, in the locked configuration, the set screw extends into the groove axially relative to the fastener body and, in the unlocked configuration, the set screw is removed from the groove; and wherein the fastener body and the fastener are configured to remain in the same configuration relative to the second leaf in the locked and unlocked configurations.

7. The hinge system of claim 1, wherein the fastener is a dog-point mounting bolt with a dog-point end, whereby the dog-point end is receivable within the groove when the hinge is in the locked configuration.

8. The hinge system of claim 1, wherein the first leaf has a sloped top surface.

9. The hinge system of claim 8, wherein the second leaf has a sloped top surface.

10. The hinge system of claim 1, wherein the fastener is a first fastener in a set of fasteners also including a second fastener;

wherein the first leaf has a first leaf contact surface configured to contact a side of the enclosure body when secured thereto and a first leaf mounting hole configured to receive the second fastener therein to secure the first leaf to the enclosure body; and wherein the first leaf contact surface has a recessed ring disposed around the first leaf mounting hole configured to receive an O-ring therein to maintain a liquid tight connection between the first leaf and the enclosure body.

11. The hinge system of claim 10, wherein the second leaf has a second leaf contact surface configured to contact a side of the enclosure door when secured thereto and a second leaf mounting hole configured to receive the fastener therein to secure the second leaf to the enclosure door.

12. An enclosure comprising:

an enclosure body;

an enclosure door; and a hinge system that is convertible between a locked configuration in which the enclosure door is fixed to the enclosure body and an unlocked configuration in which the enclosure door is removable from the enclosure body, the hinge system comprising:

a first leaf with a pin, the pin having a circumferential groove;

a second leaf with a pocket; and a fastener extending through the enclosure door and the second leaf and into the pocket to secure the second leaf to one of the enclosure door or the enclosure body, with a distal end of the fastener sized to be removably receivable within the circumferential groove of the pin when the pin is received within the pocket;

wherein, with the hinge system in the locked configuration the fastener is received within the groove to secure the pin within the pocket and thereby secure the second leaf and the enclosure door in pivoting engagement with the first leaf and the enclosure body; and wherein, with the hinge system in the unlocked configuration, the fastener is clear from the groove to release the pin to be removed from the pocket and thereby permit the enclosure door and the second leaf to be disengaged from the enclosure body and the first leaf.

13. The enclosure of claim 12, wherein the fastener is a first fastener in a set of fasteners also including a second fastener;

wherein the second fastener is configured to extend into the second leaf transverse to a pocket axis of the pocket and also configured to secure the second leaf to the one of the enclosure door or the enclosure body and remain in the same configuration relative to the second leaf in the locked and unlocked configurations.

14. The enclosure of claim 13, wherein the first and second fasteners are spaced arranged axially along the pocket, relative to the direction of the pocket axis.

15. The enclosure of claim 14, wherein the second fastener extends at least partially into the pocket.

16. The enclosure of claim 12, wherein the circumferential groove has a groove width and the fastener is a threaded fastener having a major diameter; and wherein the major diameter of the threaded fastener is smaller than the groove width.

17. The enclosure of claim 12, further including a liquid shedding feature configured as at least one of:

a sloped top surface on the first leaf;

a sloped top surface on the second leaf; or an O-ring within a recessed ring on a first leaf contact surface of the first leaf and configured to provide a liquid tight seal between the first leaf and the enclosure door.

18. The enclosure of claim 12, wherein the fastener has a fastener body, a fastener head, and a fastener axis, and further includes a set screw extending through the fastener body and the fastener head along the fastener axis;

wherein the set screw is configured to be moved axially relative to the fastener body and the fastener head into the groove to move the hinge system into the locked configuration and to be removed from the groove to move the hinge system into the unlocked configuration, with the fastener body and the fastener remaining stationary relative to the second leaf.

19. A method for an enclosure with an enclosure door, an enclosure body, and a hinge assembly, the method comprising installing the enclosure door by:

with a first leaf of the hinge assembly secured to the enclosure body and a second leaf of the hinge assembly secured to the enclosure door, moving the enclosure door to align a pin that extends from the first leaf with a pocket of the second leaf;

lowering the enclosure door to insert the pin into the pocket and thereby pivotally engage the enclosure door with the enclosure body, with a circumferential groove on the pin extending within the pocket; and after inserting the pin into the pocket, moving the hinge assembly to a locked configuration by extending a fastener through the enclosure door, into the pocket, and into the groove to secure the pin within the pocket and further secure the second leaf to the enclosure door.

20. The method of claim 19, further comprising removing the enclosure door by:

with the second leaf and the fastener remaining secured to the enclosure door, moving the hinge assembly to an unlocked configuration by withdrawing the fastener from the circumferential groove to release the pin for removal from the pocket; and with the hinge assembly in the unlocked configuration, lifting the enclosure door to remove the pin from the pocket and thereby release the enclosure door from the enclosure body.

* * * * *